(12) United States Patent
Sridhar et al.

(10) Patent No.: US 6,263,740 B1
(45) Date of Patent: Jul. 24, 2001

(54) CMOS COMPATIBLE INTEGRATED PRESSURE SENSOR

(75) Inventors: Uppili Sridhar; Loke Mnoon Yan; Foo Pang Dow, all of Singapore (SG)

(73) Assignee: Institute of Microelectronics, Singapore (SG)

( * ) Notice: Subject to any disclaimer, the term of this patent is extended or adjusted under 35 U.S.C. 154(b) by 0 days.

(21) Appl. No.: 09/620,197

(22) Filed: Jul. 20, 2000

Related U.S. Application Data

(62) Division of application No. 09/173,152, filed on Oct. 14, 1998, now Pat. No. 6,122,975.

(30) Foreign Application Priority Data

Nov. 25, 1997 (SG) .................................................. 9704127

(51) Int. Cl.[7] .................................. G01L 9/00; G01L 9/16
(52) U.S. Cl. ........................................................... 73/754
(58) Field of Search ........................ 438/53, 977; 73/754, 73/715–727; 257/257, 274, 417, 419

(56) References Cited

U.S. PATENT DOCUMENTS

| | | | |
|---|---|---|---|
| 5,281,836 | * 1/1994 | Mosser et al. | 257/254 |
| 5,343,064 | * 8/1994 | Spangler et al. | 257/350 |
| 5,589,082 | * 12/1996 | Lin et al. | 216/2 |
| 5,589,689 | * 12/1996 | Koskinen | 250/339.01 |
| 5,631,198 | * 5/1997 | Hartauer | 438/53 |

FOREIGN PATENT DOCUMENTS 0 040 795   12/1981   (EP) .

* cited by examiner

*Primary Examiner*—William Oen
(74) *Attorney, Agent, or Firm*—Proskauer Rose, LLP

(57) ABSTRACT

A pressure sensor fabricated onto a substrate using conventional CMOS fabrication processes. The pressure sensor is built on a substrate having a first conductivity type and has defined in it a well of an opposite conductivity type. This well defines a membrane. Resistors are diffused into the well. Source/drain regions are provided for leadouts for the resistors. An n-cap is provided for the resistors. Metalization contacts may be provided to connect the membrane to a positive bias during a membrane etching process. A cavity is provided on the underside of the substrate through which pressure is applied to the membrane. Signal conditioning circuitry, such as an operational amplifier, may also be fabricated on the same substrate preferably using the same IC processes.

14 Claims, 7 Drawing Sheets

CMOS COMPATIBLE INTEGRATED PRESSURE SENSOR

RELATED APPLICATION

This application is a divisional of Ser. No. 09/173,152, filed Oct. 14, 1998, now U.S. Pat. No. 6,122,975.

FIELD OF THE INVENTION

The present invention relates to a process for fabricating integrated circuit sensors and, more particularly, to a process for fabricating silicon micromachined pressure sensors compatible with a complementary metal oxide semiconductor process.

BACKGROUND OF THE INVENTION

Microsystems technology is a rapidly developing field. One range of microsystems applications is the combination of actuators or sensors and electronic circuits onto a single integrated circuit device. Currently, integrated circuit (IC) sensors and actuators, such as piezoresistive pressure sensors, are manufactured using a surface micromachining process. Surface micromachining has advantages over the previous bulk micromachining process of fabricating sensors and actuators because it permits smaller devices and may by integrated with other circuits on an IC.

One IC technology is complementary metal oxide semiconductor (CMOS) technology. This well-known IC fabrication process provides a very high cell-density (e.g., many circuits per unit area), is relatively inexpensive, and yields reliable circuits. It would be desirable to fabricate piezoresistive pressure sensors, for example, using CMOS technology.

Several techniques for integrating sensors and signal conditioning circuits onto a single IC are known. FIGS. 1A and 1B are a cross-sectional view and top view, respectively, of a conventional IC piezoresistive pressure sensor. As seen in FIGS. 1A and 1B, a piezoresistive pressure sensor 100 includes a silicon membrane (or diaphragm) 102 micromachined onto a silicon substrate 104. Resistors 106 are diffused into the membrane 102 at certain locations. A cavity 108 is provided on the underside of the substrate 104 from which pressure is applied to the membrane 102. Pressure on the silicon membrane stresses the membrane, which affects the resistance of the resistors 106. The change in resistance 106 is detected by external circuitry 110, and the change of resistance is used to determine the pressure applied to the membrane 102.

In order for a piezoresistive sensor described above to operate, membranes having different thicknesses are used for sensing different pressure ranges. Thicknesses typically range from 10 microns to 30 microns. For example, it may be preferable to use a 15 micron thick membrane to sense 15 psi pressure. Thus, in order to provide an accurate piezoresistive pressure sensor for a particular pressure range, the membrane must be fabricated to a precise thickness.

Two techniques typically used for fabricating a micromachined piezoresistive sensor are (1) surface micromachined silicon etching and wafer bonding; and (2) using epitaxial wafers for electrochemical etch stopping. Neither technique is compatible with CMOS fabrication technology. For example, the second technique achieves a precise membrane thickness using an electrochemical etch stop method. FIGS. 2A and 2B illustrate the fabrication of a conventional IC piezoresistive pressure sensor using this second technique. As seen in FIG. 2A, a p-type silicon substrate 202 has an n-type epitaxial layer 204 grown on it. As seen in FIG. 2B, the substrate is etched through etch windows 206 using alkaline etchants (such as KOH) in an etch bath. At the same time, a positive bias 208 is applied to the epitaxial layer 204. The positive bias does not affect the p-type substrate due to the n-p reverse bias condition. The n-type epitaxial layer (which forms the membrane) is prevented from being etched due to the passivating positive bias. This allows a precise membrane thickness to be obtained. CMOS processes, however, do not allow for n-type epitaxial layers on the substrate. Resistors may then be formed in the membrane using p-type diffusion doping.

Therefore it is an object of the present invention to provide a process for manufacturing IC sensors that is compatible with conventional IC processes, such as CMOS.

SUMMARY OF THE INVENTION

This and other objects of the present invention are provided by a novel process for fabricating an integrated circuit sensor. In a preferred embodiment of the present invention, a pressure sensor is fabricated onto a substrate using conventional IC fabrication processes, such as CMOS processes.

A preferred embodiment of the present invention includes a pressure sensor integrated onto an IC using CMOS processes. The pressure sensor is preferably built on a substrate having a first conductivity type (such as p-type) and has defined in it a well of an opposite conductivity type (such as n-type). This well defines a membrane. Resistors are diffused into the well. In a preferred embodiment, four resistors are provided. Two of these resistors are oriented parallel to the principal stress of the membrane and two resistors are oriented perpendicularly to the principal stress of the membrane. Source/drain doping in the CMOS process are also used for providing leadouts for the resistors. A cap (such as an n-cap) is provided for the resistors to bury the resistors and shield them from oxide or outside charges, thus increasing their electrical stability. Metalization contacts may be provided to connect the membrane to a positive bias during a membrane etching process. A cavity is provided on the underside of the substrate through which pressure is applied to the membrane. Signal conditioning circuitry, such as an operational amplifier, may also be fabricated on the same substrate and, preferably, using the same IC processes. The cap may preferably be implanted during implantation of a lightly doped drain region of the signal conditioning circuitry.

A pressure sensor according to the present invention may be fabricated using the following preferred process:
1. in a substrate having a first conductivity type, forming a well region having a second, opposite conductivity type;
2. forming in the well one or more resistors;
3. forming source and drain regions in portions of the well and resistors;
4. implanting impurities having the second conductivity type over a surface of the well, resistors, and source and drain regions;
5. forming metal contacts connected to the well; and
6. forming a cavity on the underside of the sensor by applying an electrical bias of the first conductivity type on the well via the contacts while etching the substrate, thus defining in the well a membrane having precise thickness.

In a preferred embodiment of the present invention, steps 2–5 may be performed during conventional IC processing (such as CMOS processing). Step 1 constitutes a pre-processing stage and step 6 constitutes a post-processing stage.

BRIEF DESCRIPTION OF THE DRAWINGS

The present invention is described with reference to the following figures.

DETAILED DESCRIPTION OF PREFERRED EMBODIMENTS

The present invention is described in three sections. An overview of the invention is provided with reference to FIG. 3. A preferred technique for fabricating the invention is described with reference to FIGS. 4A–4F. Operation of the invention is described with reference to FIGS. 5 and 6.

1. Overview of the Invention

Figure 1A:
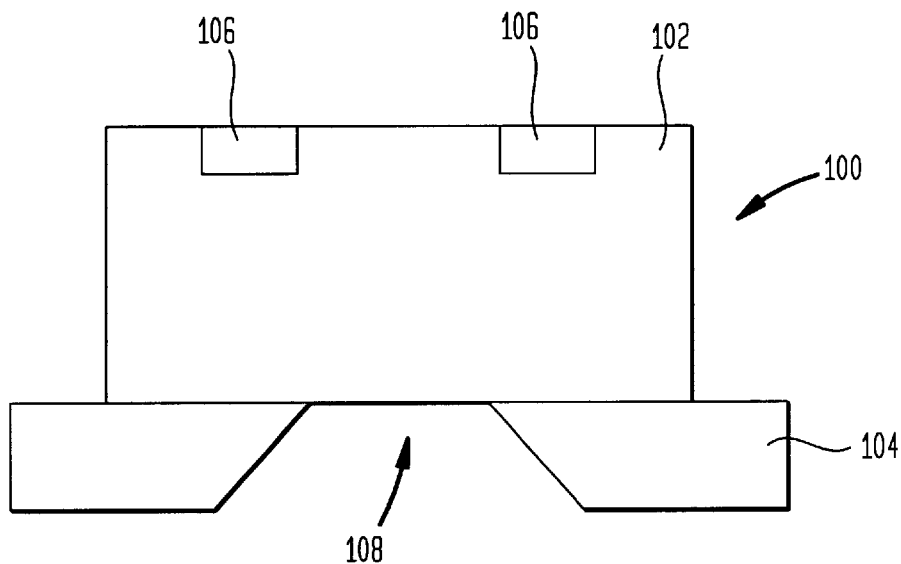
FIG. 1A is a cross-sectional view of a conventional IC piezoresistive pressure sensor.
Figure 1B:
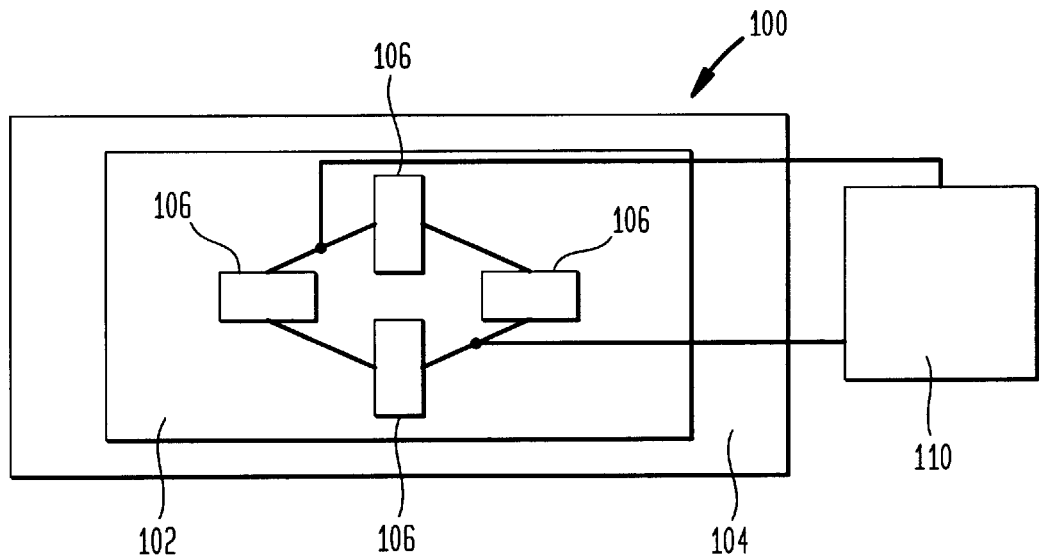
FIG. 1B is a top view of the conventional IC piezoresistive pressure sensor of FIG. 1A.
Figure 2A:
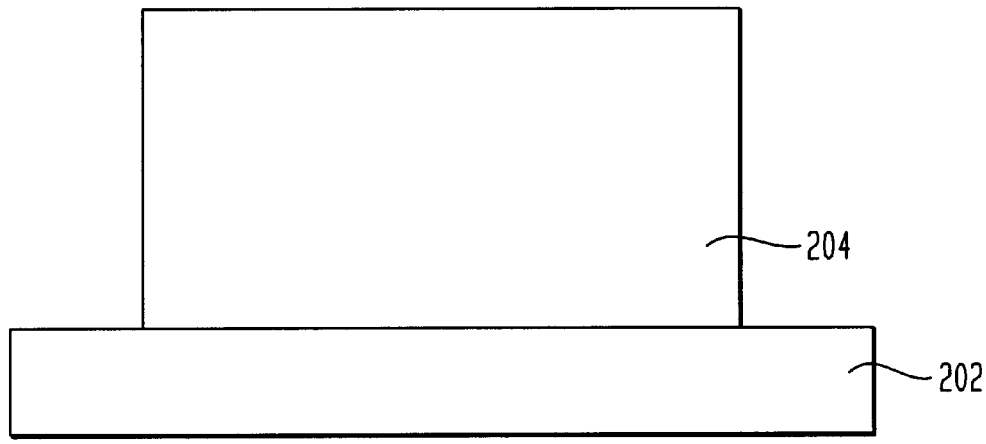
FIGS. 2A and 2B are cross-sectional views illustrating a conventional fabrication technique for a conventional IC piezoresistive pressure sensor.
Figure 2B:
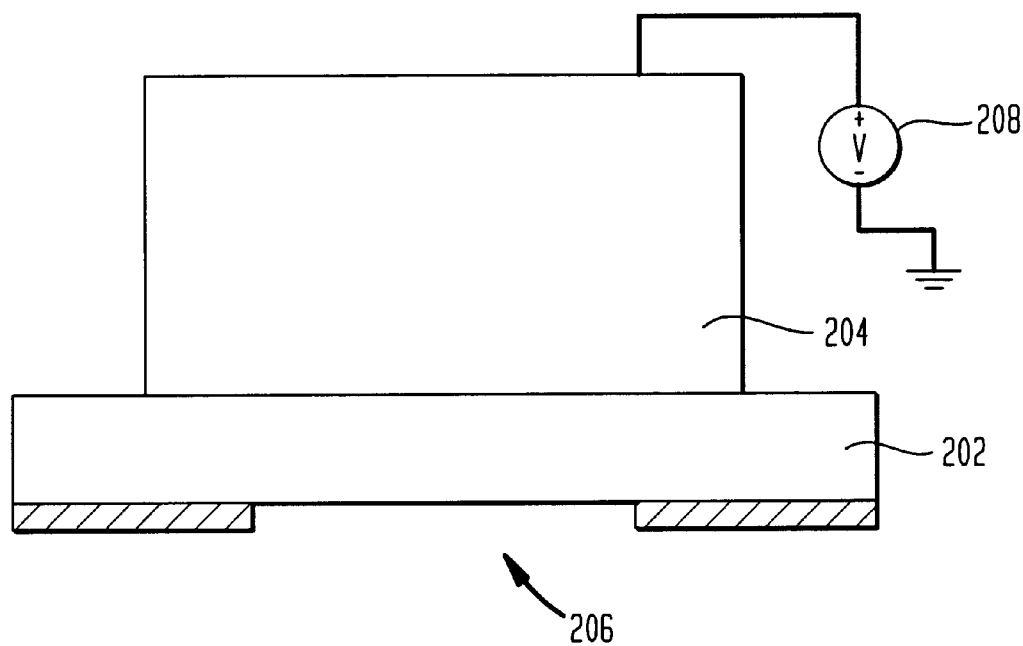
Figure 3:
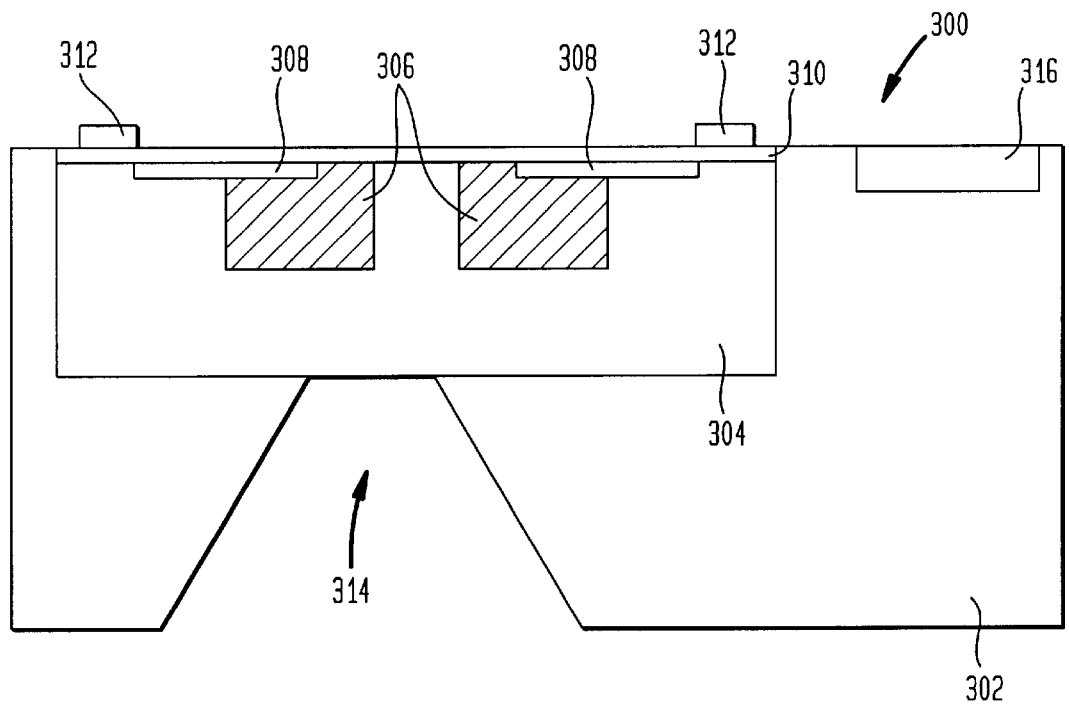
FIG. 3 is a cross-sectional view of an IC pressure sensor according to a preferred embodiment of the present invention.

FIG. 3 is a cross-sectional view of a preferred embodiment of the present invention. FIG. 3 shows a pressure sensor 300 integrated onto an IC using CMOS processes. The pressure sensor 300 is built on a substrate 302, such as a p-type silicon substrate, and has an n-well 304 which defines a membrane. A person skilled in the art readily appreciates, however, that an n-type substrate having a p-well may also be used. Piezoresistive resistors 306 are formed in the n-well. In a preferred embodiment, four resistors are provided. Two of these resistors are oriented parallel to the principal stress of the membrane and two resistors are oriented perpendicularly to the principal stress of the membrane. Source/drain regions 308 are provided for leadouts for the resistors 306. An n-cap 310 is provided for the resistors 306. Metalization contacts 312 (aluminum, for example) connect the n-well membrane to a large pad (not shown). This pad may be used during membrane etching to apply a positive bias to all of the n-well membranes. As further appreciated by a person skilled in the art, if in an alternate embodiment an n-type substrate having a p-well is used, then the cap 310 may be implanted as p-type (e.g., a p-cap). A cavity 314 is provided on the underside of the substrate 302 through which pressure is applied to the membrane 304. Signal conditioning circuitry 316, such as an operational amplifier or other CMOS circuitry, may also be fabricated on the same substrate 302.

2. A Preferred Technique for Fabricating the Invention

A preferred technique for fabricating the pressure sensor 300 of FIG. 3 is described with reference to FIGS. 4A–4F, which are cross-sectional views. The preferred fabrication process uses a double polysilicon, double metal CMOS fabrication process. The pressure sensor 300 fabrication process may be incorporated into a 0.8 $\mu$m standard CMOS fabrication process preceded by a pre-processing stage and followed by a post-processing stage. In the preferred fabrication process, the CMOS fabrication process is performed without any interruption or modification of a standard CMOS fabrication flow with the exception of a fabrication process for forming piezo resistors as discussed in more detail below.

Figure 4A:
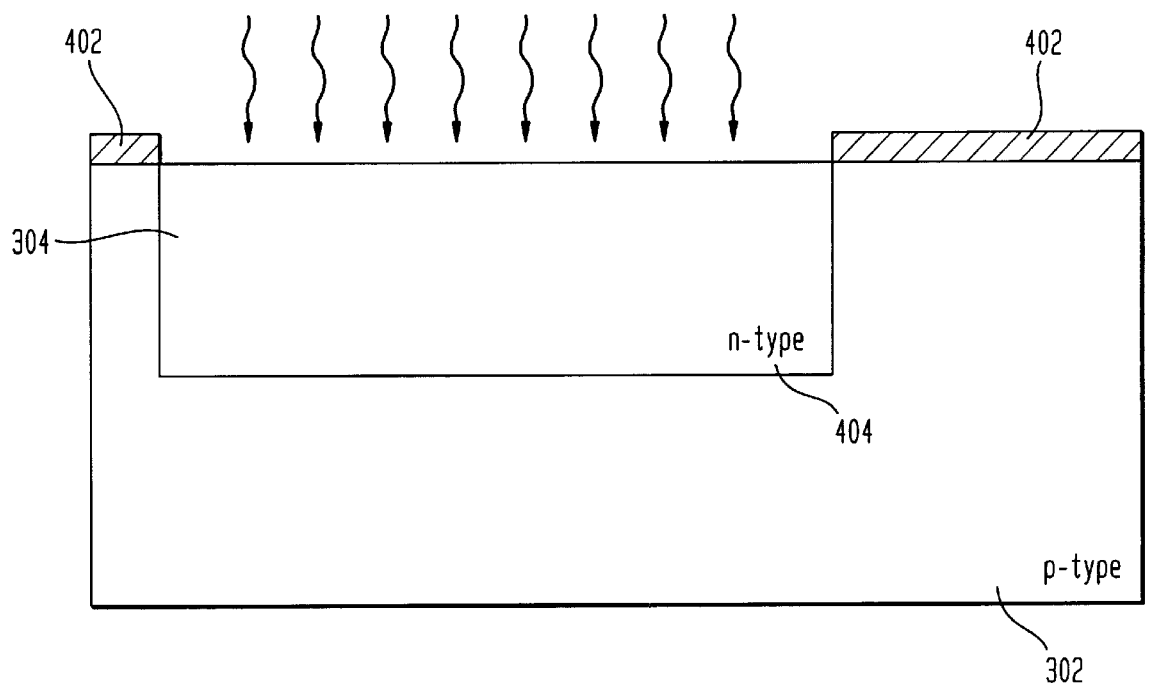
FIGS. 4A–4F are cross-sectional views illustrating a preferred fabrication technique according to a preferred embodiment of the present invention.

As seen in FIG. 4A, during the pre-processing stage, a p-type substrate 302 is masked with photoresist 402, such as an oxide layer, and an n-type impurity, such as phosphorous, is implanted onto the unmasked areas of the substrate. The impurity is implanted at a dosage of $0.5-5 \times 10^{15}/cm^2$ and diffused illustratively to an impurity concentration in the range of $10^{18}/cm^3$. The resultant n-well 304 creates an n-p junction 404. In a preferred embodiment, the n-well is between 10 and 30 microns deep, depending on the pressure to be sensed. The above described diffusion scheme is designed not to place thermal stress on the substrate 302. Thus, thermal stress induced silicon warpage is minimized.

Figure 4B:
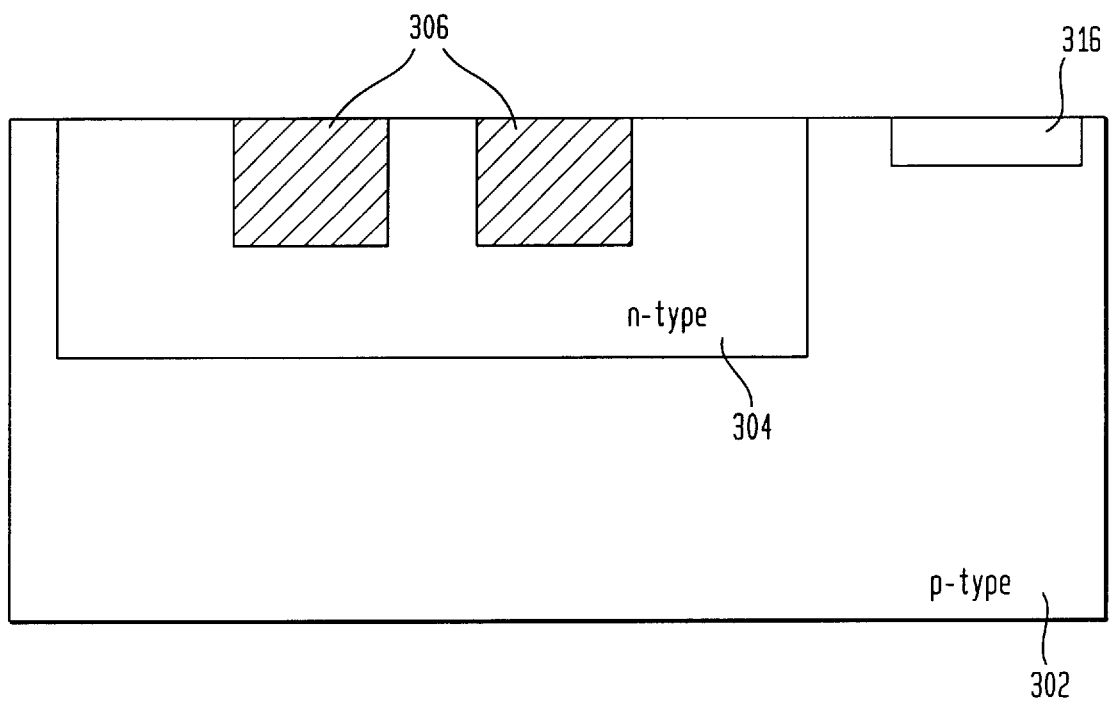
Figure 4C:
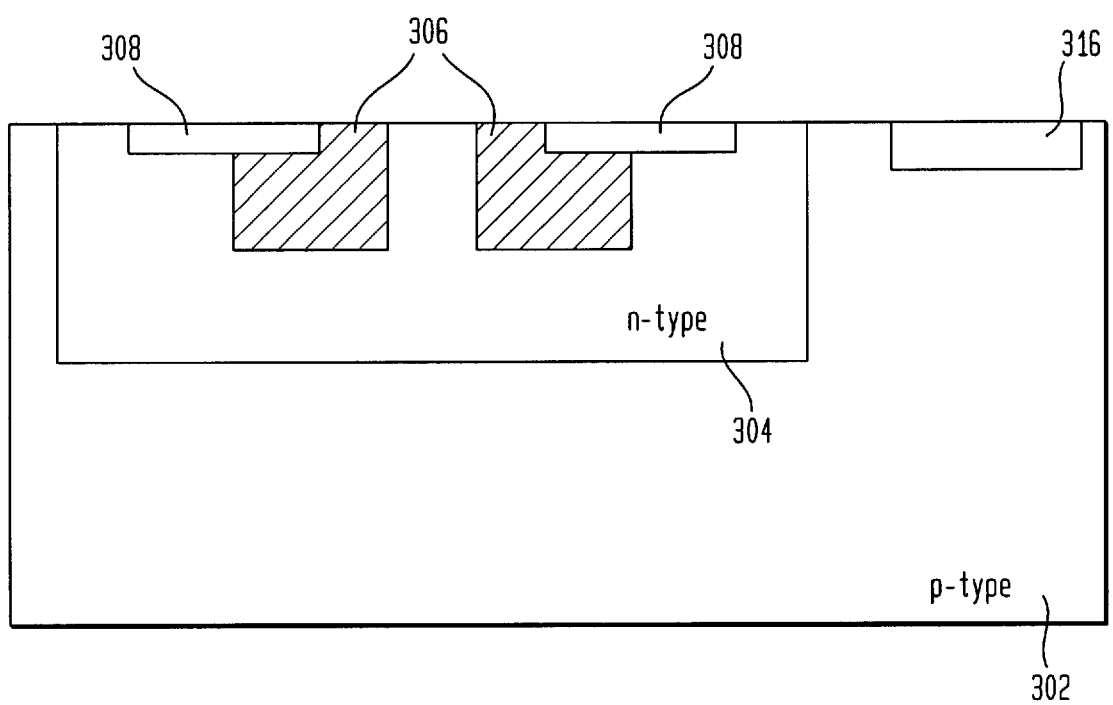

After the n-well is formed, the oxide layer is stripped and conventional CMOS processing may begin. This may be done, for example, to fabricate CMOS circuitry 316 on the substrate 302. Prior to the well-known LOCOS field oxidation step of the CMOS process, the standard CMOS fabrication flow is interrupted to form piezoresistive resistors 306 which may be implanted as shown in FIG. 4B. To form the piezoresistive resistors 306, the substrate and n-well are masked, preferably using a photolithography step (not shown), leaving selected portions of the n-well exposed. A boron implant is made at a dosage of $1 \times 10^{14}/cm^2$ to $5 \times 10^{14}/cm^2$ into the exposed portions of the n-well/membrane 304. The boron implant may illustratively be a doubly ionized B11++ion implantation. Thereafter, the mask is stripped away. Preferably, each resister has 5 kΩ resistance and has a depth between 0.5 $\mu$m and 1.5 $\mu$m. Of course, the resistors 306 are preferably not deeper than the n-well 304. In a preferred embodiment, four resistors are provided. Two of these resistors are oriented parallel to the principal stress of the membrane and two resistors are oriented perpendicularly to the principal stress of the membrane. As seen in FIG. 4C, a selected portion of the n-well 304 and resistors 306 are doped with boron at a dopant concentration of $1-10 \times 10^{20}$ $cm^{-3}$ to create positive MOS (PMOS) source and drain regions 308. In a preferred fabrication process, if CMOS circuitry is being integrated onto the same substrate, the source and drain regions 308 may be formed during the CMOS source and drain fabrication process. The source and drain regions 308 may be used as heavily doped leadouts for the resistors 306.

Figure 4D:
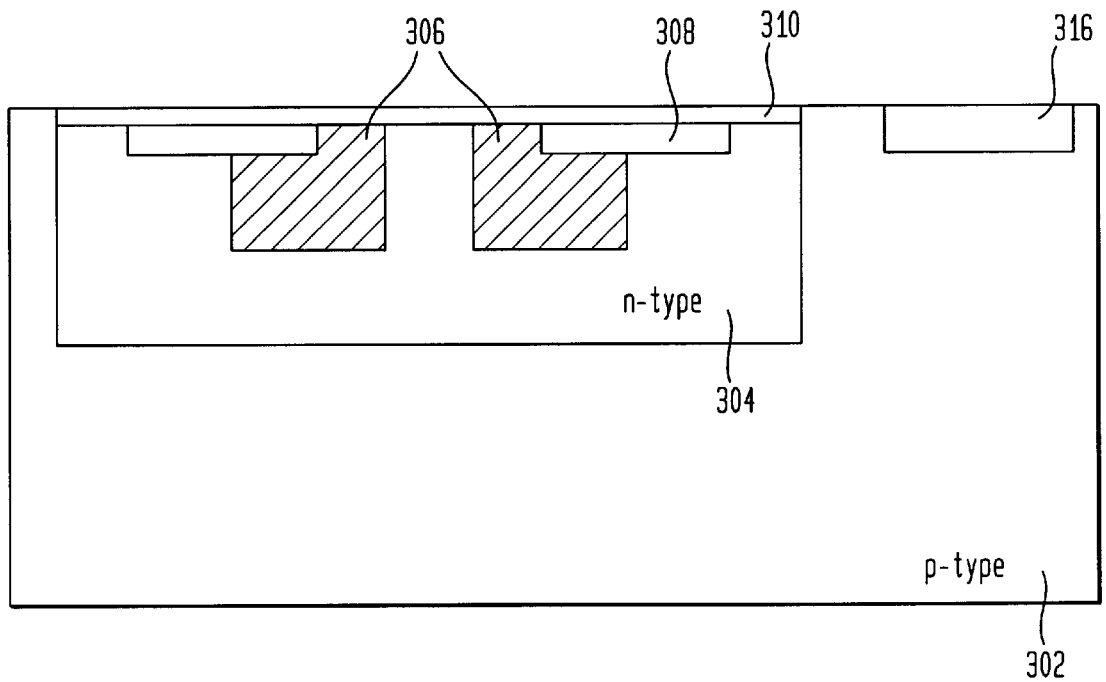
Figure 4E:
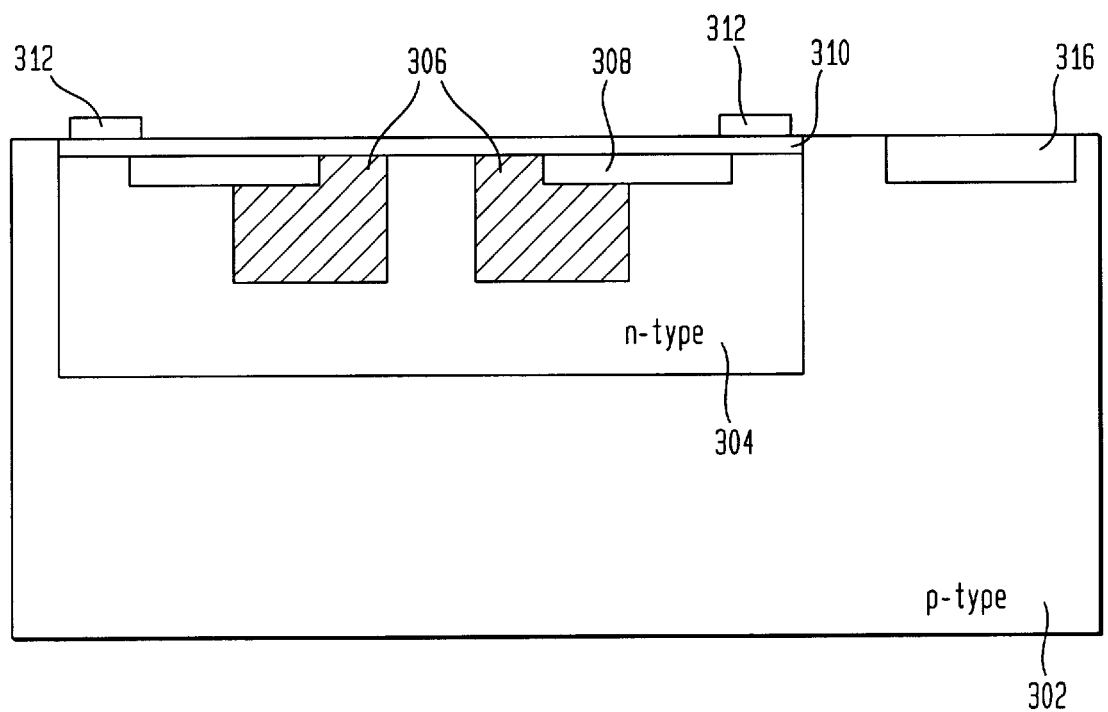

As seen in FIG. 4D, an n-cap 310 may be implanted on top of the n-well 304, resistors 306, and source/drain regions 308 with phosphorous at a dosage of 0.1 to $1 \times 10^{14}/cm^2$ and having a depth of 0.1 $\mu$m to 0.5$\mu$m. The n-cap 310 for the resistors 306 is preferably implanted as part of the CMOS fabrication process during implantation of an N-type lightly doped drain (LDD) region for the signal conditioning circuitry 316. The n-cap 310 achieves highly electrically stable resistors by "burying" the piezoresistors 306. This increases the electrical stability of the piezoresistors by shielding the p-type resistors from oxide or outside charges. Without the n-cap 310, the piezoresistor 306 is likely to drift in value due to the depletion of the resistor by the electric field induced by varying surface or oxide charges. Burying the piezoresistor under an n-type capping layer eliminates the depletion effects and results in a time invariant resistor. The result is a very stable pressure sensor output. As seen in FIG. 4E, metalization of the IC is performed. Metal (such as aluminum or other suitable metal) contacts 312 are formed on the n-well 304. The metal contacts 312 connect the n-well/membrane areas of pressure sensors on the IC to a pad (not shown). The pad is used to apply positive bias to the n-well during the post CMOS processing stage when the membrane etching step, described below, is performed.

Figure 4F:
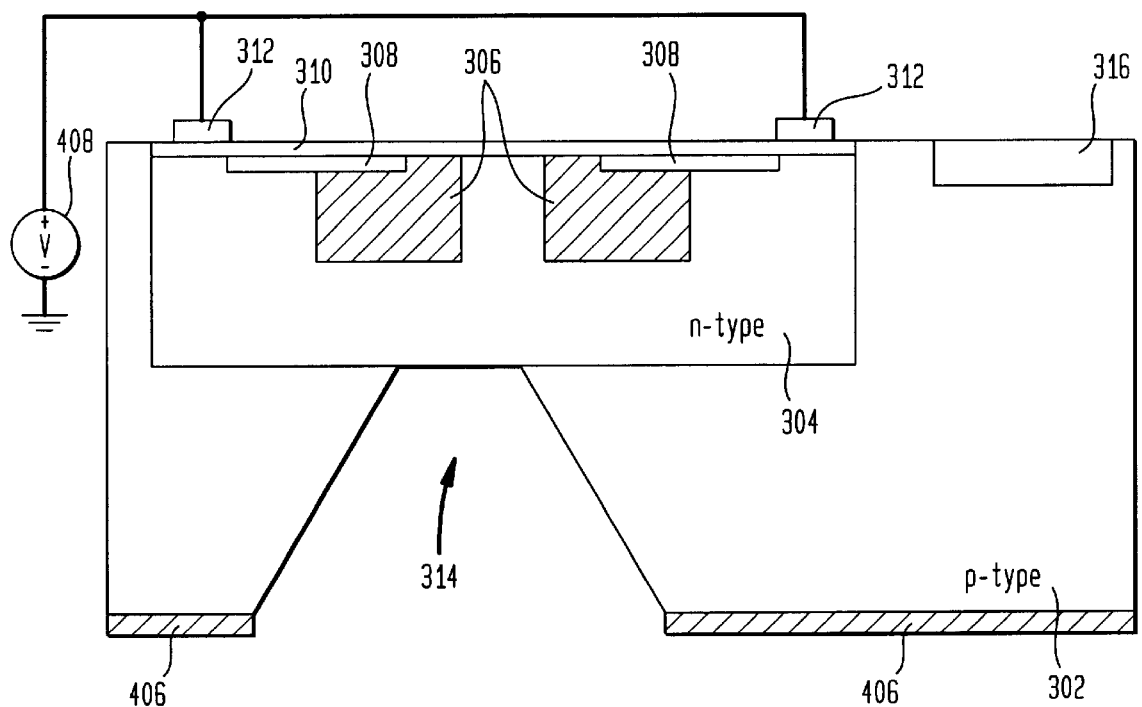

After metalization is completed, the remaining step is to form the cavity 314 during the post-processing stage. In FIG. 4F, a mask/etch window 406 is shown formed on the underside of the substrate 302. The mask/etch window 406 may be formed by depositing a layer of PECVD oxide and nitride (not shown) on a backside portion of the substrate 302. Thereafter, selected portions of the PECVD oxide and nitride layer may be exposed through a photo mask and etched to form the mask/etch window 406.

To form the cavity 314 using the preferred fabrication process, the substrate is mounted in a chuck and an electrochemical etching process is performed. A bias having the same conductivity type as the substrate, illustratively shown as a positive bias 408, is applied to the membrane 304 via metal contacts 312. (The bias may be applied to a conductive pad, which pad is connected to the metal contacts 312.) The positive bias does not affect the p-type substrate 302 due to the n-p reverse bias condition. The substrate is etched through the mask/etch window 406 using an etchant such as an alkaline etchant. The alkaline etchant may illustratively be KOH. The n-well which forms the membrane is prevented from being etched due to the passivating positive bias. This allows a precise membrane thickness to be obtained. This biasing scheme, which uses an n-p junction at every membrane, isolates the membrane from edge leakage after finishing fabrication.

The ion implanted silicon membrane 304 has a flat profile as seen in FIGS. 3 and 4A–4F. The process described above allows the membrane thickness to be precisely controlled to within $10^{15}$ cm$^{-3}$, thus providing precise resistor control. This results in a sensor having excellent precision.

All of the steps described above may be performed during conventional CMOS processes except for the initial n-well implant and diffusion (the pre-processing stage, see FIG. 4A), the formation of the piezoresistive resistors 306 (see FIG. 4B), and the backside etching (the post-processing stage, see FIG. 4F). The additional fabrication of the pressure sensor does not alter the CMOS thermal budget. As a result, the process for making an IC pressure sensor and associated CMOS signal conditioning circuitry (such as an analog CMOS operational amplifier) 316 may be achieved at substantial cost and time savings over conventional methods.

3. Operation of the Invention

Figure 5:
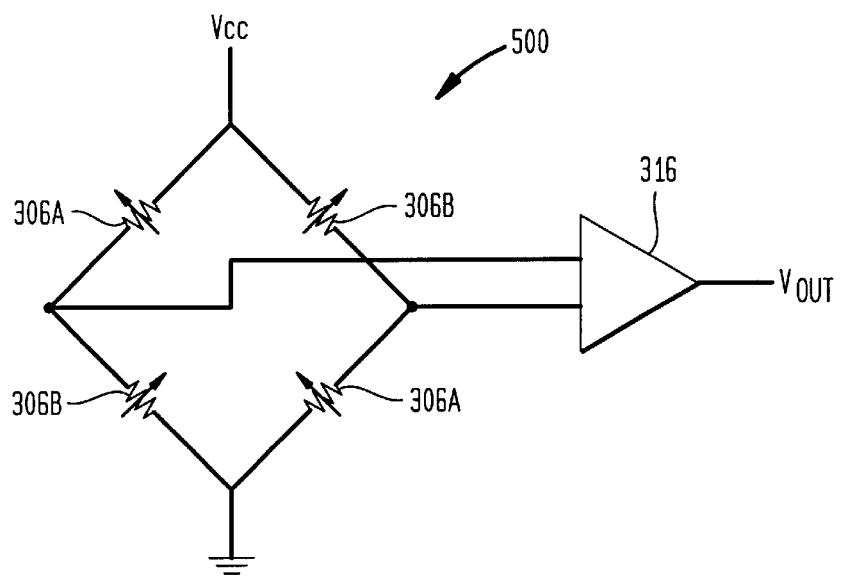
FIG. 5 is a schematic diagram illustrating the operation of a preferred embodiment of the present invention.

FIG. 5 is a schematic diagram illustrating the operation of a pressure sensor according to a preferred embodiment of the present invention. FIG. 5 shows a Wheatstone bridge 500 having four resistors. In the present invention, two of these resistors 306A are oriented parallel to the principal stress of the membrane and two resistors 306B are oriented perpendicularly to the principal stress of the membrane. A signal conditioning circuit 316, such as an operational amplifier, preferably an analog CMOS operational amplifier integrated on the same substrate as the sensor, has its terminals connected between resistors of opposite orientation.

When pressure is applied to the membrane 304 at cavity 314 (see FIG. 3), the resistors 306A (having an orientation parallel to the stress) experience a positive relative change in resistance and the resistors 306B (having an orientation perpendicular to the stress) experience a negative relative change in resistance. If the resistors experience the same amount of stress for an applied pressure, the sensitivity of the pressure sensor device may be determined as:

$$\frac{V_{out}}{V_{in}} \cong \frac{1}{2}\pi_{44}\sigma$$

where:
$\pi_{44}$= piezoresistive coefficient; and
$\sigma$= principal stress.

Preferably, the resistors are 5 kΩ and the full scale output at 10V and 15 psi=45 mV.

Figure 6:
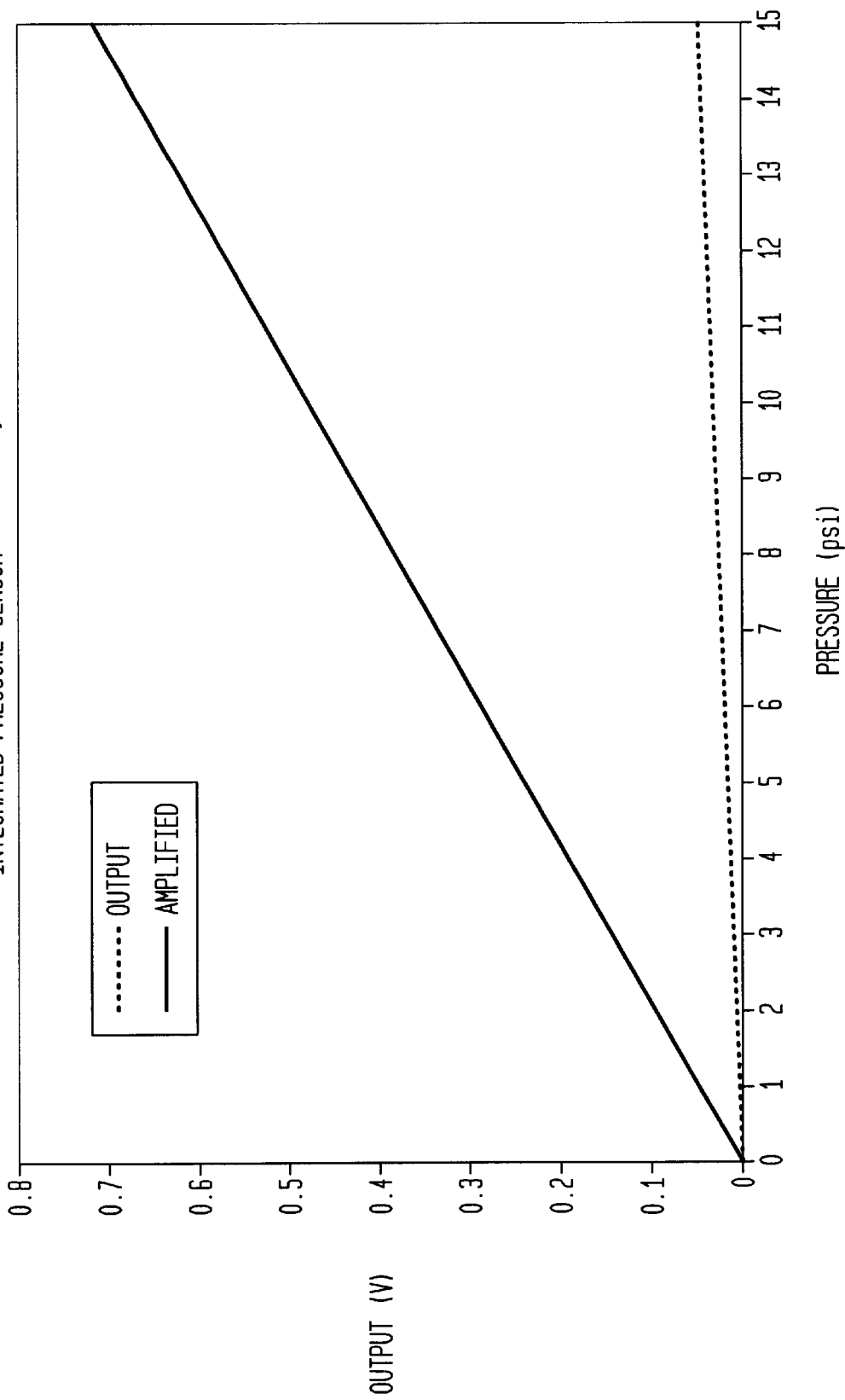
FIG. 6 is a graph illustrating the pressure exerted on the sensor versus the voltage output by a pressure sensor according to the present invention and the voltage output by an amplifier connected to the sensor.

FIG. 6 is a graph 600 illustrating the voltage change exhibited by a pressure sensor according to the present invention having a 14 micron thick membrane 304 and $V_{CC}$=10V. The voltage output by the sensor before being amplified by an operational amplifier is shown in the dashed line. The voltage output by the operational amplifier ($V_{OUT}$ of FIG. 5) is shown in the solid line. The above described embodiments of the invention are intended to be illustrative only. Numerous alternative embodiments may be devised by those skilled in the art without departing from the spirit and scope of the following claims.

We claim:

1. A micromachined pressure sensor, comprising:
   a. a substrate having a first conductivity type and defining a cavity on a first side;
   b. a well having a second, opposite conductivity type imbedded into a second side of the substrate and in contact with the cavity, the well defining a membrane, where said well directly contacts said substrate;
   c. at least one resistor defined in the membrane;
   d. a source and a drain region connected to the at least one resistor; and
   e. a cap having the second conductivity type on a surface of the at least one resistor.

2. The sensor of claim 1, further comprising metal contacts connected to the membrane.

3. The sensor of claim 2, wherein the metal contacts are configured to connect to a bias during a membrane etch process.

4. The sensor of claim 1, further including a signal conditioning circuit connected to the at least one resistor.

5. The sensor of claim 4, wherein the signal conditioning circuit is integrated on the substrate.

6. The sensor of claim 4, wherein the signal conditioning circuit is an operational amplifier.

7. The sensor of claim 4, wherein the signal conditioning circuit is an analog operational amplifier.

8. The sensor of claim 1, wherein the at least one resistor is one of four resistors.

9. The sensor of claim 8, wherein two resistors are oriented parallel to a principal stress of the membrane and two resistors are oriented perpendicularly to the principal stress of the membrane.

10. The sensor of claim 1, wherein the source and drain regions are leadouts for the at least one resistor.

11. The sensor of claim 1, wherein the cap is configured to shield the at least one resistor from outside charges.

12. The sensor of claim 1, wherein the cap is configured to eliminate depletion effects.

13. The sensor of claim 1, wherein the at least one resistor is one of four resistors arranged as a Wheatstone bridge and having a signal conditioning circuit connected thereto.

14. The sensor of claim 13, wherein pressure may be detected according to:

$$\frac{V_{out}}{V_{in}} \cong \frac{1}{2}\pi_{44}\sigma$$

where:
$\pi_{44}$=piezoresistive coefficient;
$\sigma$=principal stress;
$V_{IN}$=a voltage applied to the Wheatstone bridge; and
$V_{OUT}$=a voltage output by the signal conditioning circuit.

* * * * *